US010986131B1

(12) United States Patent
Kruse et al.

(10) Patent No.: US 10,986,131 B1
(45) Date of Patent: Apr. 20, 2021

(54) ACCESS CONTROL POLICY WARNINGS AND SUGGESTIONS

(71) Applicant: Amazon Technologies, Inc., Seattle, WA (US)

(72) Inventors: William Frederick Hingle Kruse, Seattle, WA (US); Ashish Rangole, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 14/574,308

(22) Filed: Dec. 17, 2014

(51) Int. Cl.
*H04L 29/06* (2006.01)
*H04W 12/08* (2021.01)

(52) U.S. Cl.
CPC .............. *H04L 63/20* (2013.01); *H04L 63/10* (2013.01); *H04L 63/101* (2013.01); *H04W 12/08* (2013.01)

(58) Field of Classification Search
CPC ....... H04L 63/20; H04L 63/10; H04L 63/101; H04W 12/08
USPC ............................................................ 726/1
See application file for complete search history.

(56) References Cited

U.S. PATENT DOCUMENTS

| | | | | |
|---|---|---|---|---|
| 6,460,141 B1 * | 10/2002 | Olden | ................... | G06F 21/604 726/12 |
| 7,143,439 B2 * | 11/2006 | Cooper | ............... | H04L 41/0609 726/11 |
| 7,290,275 B2 * | 10/2007 | Baudoin | ................ | G06Q 40/08 726/1 |
| 7,383,568 B1 * | 6/2008 | Newstadt | ............ | H04L 63/0263 726/1 |
| 7,702,779 B1 | 4/2010 | Gupta et al. | | |
| 8,046,466 B2 * | 10/2011 | Sutou | .................... | G06F 9/5083 709/226 |
| 8,074,256 B2 * | 12/2011 | Valente | ............... | H04L 41/0266 709/223 |
| 8,141,125 B2 * | 3/2012 | Maes | ...................... | H04L 67/10 706/45 |
| 8,176,527 B1 | 5/2012 | Njemanze et al. | | |
| 8,209,738 B2 * | 6/2012 | Nicol | .................... | H04L 41/142 726/1 |
| 8,266,673 B2 | 9/2012 | Hu et al. | | |
| 8,290,841 B2 | 10/2012 | Beigi et al. | | |
| 8,302,205 B2 * | 10/2012 | Kanai | ................. | G06F 21/6218 726/27 |
| 8,347,368 B2 | 1/2013 | Kato | | |

(Continued)

OTHER PUBLICATIONS

V. R. Karimi, "Formal Analysis of Access Control Policies for Pattern-Based Business Processes," 2009 World Congress on Privacy , Security, Trust and the Management of e-Business, Saint John, NB, 2009, pp. 239-242,. (Year: 2009).*

(Continued)

*Primary Examiner* — Kari L Schmidt
(74) *Attorney, Agent, or Firm* — Davis Wright Tremaine LLP

(57) ABSTRACT

Techniques for generating access control policy warnings and suggestions are disclosed herein. An access control policy change specifying changes to one or more permissions associated with the access control policy is received and, based on a set of requests for access associated with the access control policy, an access control policy warning is produced which specifying an indication of whether or not the changes to the one or more permissions should be permitted.

20 Claims, 10 Drawing Sheets

(56) References Cited

U.S. PATENT DOCUMENTS

| | | | |
|---|---|---|---|
| 8,434,126 B1* | 4/2013 | Schepis | H04N 21/44222 726/1 |
| 8,490,163 B1* | 7/2013 | Harsell | G06F 21/554 726/12 |
| 8,560,836 B2* | 10/2013 | Roegner | G06F 21/6218 713/155 |
| 8,621,552 B1* | 12/2013 | Lotem | H04L 63/0263 726/1 |
| 8,656,470 B2 | 2/2014 | Ishii | |
| 8,904,476 B2* | 12/2014 | Zurko | G06F 21/6218 726/1 |
| 9,058,210 B2 | 6/2015 | Avalani et al. | |
| 9,077,758 B1* | 7/2015 | McGovern | H04L 63/14 |
| 9,106,687 B1 | 8/2015 | Sawhney et al. | |
| 9,246,941 B1* | 1/2016 | Gibson | H04L 63/20 |
| 9,264,449 B1* | 2/2016 | Roth | H04L 63/102 |
| 9,349,014 B1 | 5/2016 | Hubing et al. | |
| 9,449,182 B1* | 9/2016 | Dang | H04L 51/04 |
| 9,626,328 B1 | 4/2017 | Kumar et al. | |
| 9,813,447 B2* | 11/2017 | Rash | H04L 63/20 |
| 9,853,979 B1* | 12/2017 | Roth | H04L 63/10 |
| 10,122,757 B1* | 11/2018 | Kruse | H04L 63/10 |
| 10,158,670 B1* | 12/2018 | Roth | H04L 63/20 |
| 10,192,425 B2* | 1/2019 | Charlton | G06F 3/0481 |
| 10,200,411 B1* | 2/2019 | Pigoski, II | H04L 63/1433 |
| 2002/0147801 A1* | 10/2002 | Gullotta | G06F 21/6218 709/223 |
| 2003/0088786 A1 | 5/2003 | Moran et al. | |
| 2003/0097383 A1* | 5/2003 | Smirnov | G06Q 10/10 |
| 2003/0110262 A1* | 6/2003 | Hasan | H04L 41/0213 709/226 |
| 2003/0110397 A1* | 6/2003 | Supramaniam | G06F 21/6209 726/1 |
| 2003/0226038 A1 | 12/2003 | Raanan et al. | |
| 2004/0181476 A1* | 9/2004 | Smith | G06Q 40/00 705/35 |
| 2004/0193606 A1* | 9/2004 | Arai | G06F 21/604 |
| 2004/0205342 A1* | 10/2004 | Roegner | G06F 21/6218 713/168 |
| 2004/0260947 A1 | 12/2004 | Brady et al. | |
| 2005/0010819 A1 | 1/2005 | Williams et al. | |
| 2005/0262132 A1* | 11/2005 | Morita | G06F 21/6218 |
| 2006/0143685 A1* | 6/2006 | Vasishth | G06F 21/577 726/1 |
| 2007/0112870 A1* | 5/2007 | Korupolu | G06F 3/0605 |
| 2007/0124797 A1* | 5/2007 | Gupta | H04L 63/102 726/1 |
| 2007/0136814 A1* | 6/2007 | Lee | G06F 21/552 726/25 |
| 2007/0156659 A1* | 7/2007 | Lim | G06F 21/6227 |
| 2007/0156670 A1* | 7/2007 | Lim | G06F 21/6218 |
| 2007/0157287 A1* | 7/2007 | Lim | G06F 21/6218 726/1 |
| 2007/0180490 A1* | 8/2007 | Renzi | G06F 21/577 726/1 |
| 2007/0282986 A1* | 12/2007 | Childress | G06Q 10/06 709/223 |
| 2007/0283443 A1 | 12/2007 | McPherson et al. | |
| 2008/0047016 A1* | 2/2008 | Spoonamore | G06F 21/577 726/25 |
| 2008/0163334 A1* | 7/2008 | Perich | H04W 8/245 726/1 |
| 2008/0222694 A1* | 9/2008 | Nakae | H04L 63/20 726/1 |
| 2009/0158407 A1* | 6/2009 | Nicodemus | H04L 63/20 726/6 |
| 2009/0182866 A1* | 7/2009 | Watanabe | G06F 11/3495 709/224 |
| 2009/0205016 A1* | 8/2009 | Milas | G06F 21/41 726/1 |
| 2009/0228951 A1* | 9/2009 | Ramesh | H04L 63/0218 726/1 |
| 2009/0254392 A1* | 10/2009 | Zander | G06F 21/6218 705/50 |
| 2009/0288135 A1* | 11/2009 | Chang | H04L 63/0263 726/1 |
| 2010/0036779 A1* | 2/2010 | Sadeh-Koniecpol | H04L 63/20 706/11 |
| 2010/0049558 A1 | 2/2010 | Beigi et al. | |
| 2010/0145917 A1* | 6/2010 | Bone | G06F 16/122 707/694 |
| 2010/0262624 A1* | 10/2010 | Pullikottil | G06F 16/2272 707/783 |
| 2010/0275263 A1* | 10/2010 | Bennett | G06F 21/577 726/25 |
| 2011/0125894 A1* | 5/2011 | Anderson | H04L 9/3213 709/224 |
| 2011/0191485 A1* | 8/2011 | Umbehocker | G06F 3/0605 709/229 |
| 2011/0197254 A1* | 8/2011 | Sallaka | G06F 21/6218 726/1 |
| 2011/0209196 A1 | 8/2011 | Kennedy | |
| 2012/0124643 A1* | 5/2012 | Moriconi | H04L 63/102 726/1 |
| 2012/0216243 A1* | 8/2012 | Gill | G06F 21/55 726/1 |
| 2012/0260306 A1 | 10/2012 | Njemanze et al. | |
| 2013/0055342 A1* | 2/2013 | Choi | G06F 21/577 726/1 |
| 2013/0091539 A1* | 4/2013 | Khurana | H04L 63/1425 726/1 |
| 2013/0091542 A1* | 4/2013 | Cohen | G06F 21/10 726/1 |
| 2013/0117847 A1 | 5/2013 | Friedman et al. | |
| 2013/0179938 A1 | 7/2013 | Choi et al. | |
| 2013/0198811 A1 | 8/2013 | Yu et al. | |
| 2013/0239177 A1* | 9/2013 | Sigurdson | H04L 63/102 726/4 |
| 2013/0246470 A1* | 9/2013 | Price | G06F 21/6218 707/783 |
| 2013/0291115 A1 | 10/2013 | Chong et al. | |
| 2014/0032670 A1* | 1/2014 | Ellingson | H04L 65/403 709/204 |
| 2014/0040979 A1* | 2/2014 | Barton | H04L 63/20 726/1 |
| 2014/0059641 A1* | 2/2014 | Chapman, II | H04L 63/1441 726/1 |
| 2014/0156588 A1 | 6/2014 | Mohanty et al. | |
| 2014/0196103 A1 | 7/2014 | Chari et al. | |
| 2014/0196104 A1* | 7/2014 | Chari | H04L 63/20 726/1 |
| 2014/0279768 A1* | 9/2014 | Rash | G06N 5/02 706/14 |
| 2014/0331277 A1* | 11/2014 | Frascadore | G06F 9/45558 726/1 |
| 2014/0343989 A1* | 11/2014 | Martini | H04L 63/104 705/7.17 |
| 2014/0359692 A1 | 12/2014 | Chari et al. | |
| 2014/0359695 A1* | 12/2014 | Chari | H04L 63/20 726/1 |
| 2014/0369209 A1* | 12/2014 | Khurshid | H04L 41/0866 370/250 |
| 2014/0379915 A1 | 12/2014 | Yang et al. | |
| 2015/0046972 A1* | 2/2015 | Zurko | G06F 21/6218 726/1 |
| 2015/0082377 A1 | 3/2015 | Chari et al. | |
| 2015/0095979 A1* | 4/2015 | Windust | H04L 63/10 726/3 |
| 2015/0143456 A1* | 5/2015 | Raleigh | H04W 12/08 726/1 |
| 2016/0044035 A1* | 2/2016 | Huang | H04L 63/0272 726/4 |
| 2016/0080399 A1* | 3/2016 | Harris | H04L 63/1433 726/23 |
| 2016/0164915 A1* | 6/2016 | Cook | H04L 63/1483 726/1 |

(56) References Cited

U.S. PATENT DOCUMENTS

2016/0191466 A1 6/2016 Pernicha
2019/0327271 A1* 10/2019 Saxena ................ G06N 3/0454
2020/0280588 A1* 9/2020 Greenebaum ....... G06F 21/6218

OTHER PUBLICATIONS

Kő, Andrea, András Gábor, and Zoltán Szabó. "Policy modeling in risk-driven environment." Proceedings of the 5th International Conference on Theory and Practice of Electronic Governance. 2011, pp. 195-203. (Year: 2011).*
Ni, Qun, et al. "Privacy-aware role-based access control." ACM Transactions on Information and System Security (TISSEC) 13.3 (2010): 1-31. (Year: 2010).*
U.S. Appl. No. 14/574,328, filed Dec. 17, 2014.
U.S. Appl. No. 14/615,347, filed Feb. 5, 2015.

* cited by examiner

ACCESS CONTROL POLICY WARNINGS AND SUGGESTIONS

CROSS-REFERENCE TO RELATED APPLICATION

This application incorporates by reference for all purposes the full disclosure of co-pending U.S. patent application Ser. No. 14/574,328, filed concurrently herewith, entitled "SELF-LEARNING ACCESS CONTROL POLICIES."

BACKGROUND

Modern computer systems place a high importance on security of user access to system resources and on maintaining current and accurate polices for the permissions of computer system users to access those system resources. Resource owners, and other administrators of resources, often use such access control policies to control access by computer system users to computing resources in order to support the business needs of the resource owners, administrators, and users. In a computer system where many users may have several assigned roles, permissions, or policies associated with and relating to many different computing resources, maintaining user roles, permissions, or policies can grow increasingly complex, particularly as the size and/or complexity of the system or the number of computer system users increases.

Accordingly, a resource owner may grant access to resources in order to perform one or more actions on behalf of the resource owner while simultaneously ensuring the security of resources. In order to manage user privileges, a resource owner may delegate authority to access a given resource in a multiplicity of different ways to allow varying levels of access to the resource according to resource access policies. Generally, in large-scale and other computing environments, changes in users, permissions, policies, or roles can make determining who has the ability to perform a given action on a resource, at a given time, a challenging problem and keeping such access policies current and secure can present further challenges. Further, the goals of keeping privileges current and secure can compete with other goals. A centralized system for managing privileges can, for example, become out of date, become over-inclusive, become under-inclusive, or fail to adjust to changing system needs. Further, with complex systems, it is often not clear how changes to policies can affect the systems' operation. An administrator with permissions for modifying policies, for example, can inadvertently add unneeded permissions (resulting in a corresponding decrease in security) and/or remove needed permissions (potentially causing legitimate attempts to access resources to fail and/or causing a system to malfunction).

BRIEF DESCRIPTION OF THE DRAWINGS

Various embodiments in accordance with the present disclosure will be described with reference to the drawings, in which.

DETAILED DESCRIPTION

Figure 1:
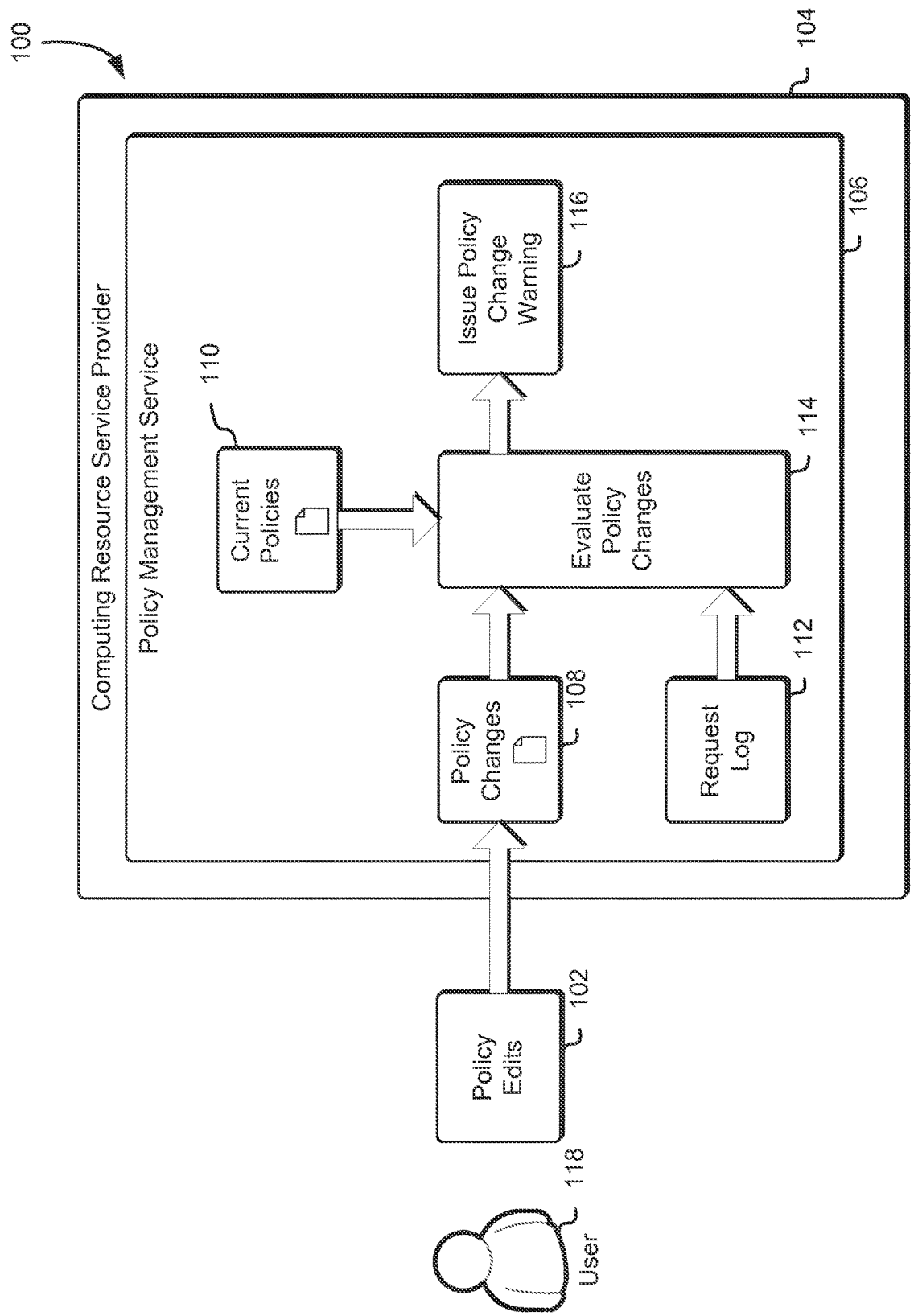
FIG. 1 illustrates an example environment in which access control policy warnings and suggestions may be generated in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and processes for using a policy management service to manage responsibilities, permissions, roles, and/or policies associated with the access to computing resources. The policy management service may retrieve access control data (e.g., data indicating what requests have been made and which privileges were invoked by those requests) associated with computing resources and may use such data to evaluate the impact of changes to existing policies. Impact of changes to existing policies may be determined by evaluating potential impact information as described below. A person who edits a policy (e.g., an administrator or other user with privileges for modifying a set of policies) may attempt to implement changes to a policy that alter the permissions granted and/or denied by that policy. Changes that cause a policy to be less than optimal because, for example, those changes remove needed permissions or those changes grant missing (but unnecessary) permissions may cause the policy management service to generate a warning to the privileged user about the proposed policy change. An access control policy warning may, for example, indicate one or more conflicts between the proposed policy change and the permissions previously granted by that policy. An access control policy suggestion may, for example, indicate one or more alternative changes that may help mitigate the effects of the proposed policy change. In some embodiments, the policy management service may also suggest an alternative to the privileged user such as, for example, to change permissions by altering the roles, groups, and/or permissions associated with the policy. In some embodiments, the policy management service may also provide a mechanism to administer such access control policy warnings (also referred to herein simply as "warnings") and/or access control policy suggestions (also referred to herein simply as "suggestions") by, for example, providing a mechanism to approve and/or deny proposed changes prior to their being applied.

A policy management service may detect potentially undesirable policy changes from a policy edit and issue corresponding warnings and suggestions when the policy edit is performed and/or when the policy edit is submitted for application. As used herein, a "policy edit" is a proposed alteration to the permissions, rules, conditions, actors, resources, or other such data associated with a policy. In an embodiment, a policy edit may be an alteration to a representation of a policy such as, for example, an alteration to a document that encodes the policy, an alteration to a graphical representation of a policy, or some other alteration to a representation of the policy. A policy edit may be made using a policy editor, which may be an application configured to make the alterations to the representation of the policy. For example, a user may initially have a policy that grants read access to a certain resource. A policy edit to such a policy would be, for example, a change that adds read and write access to that resource. The representation of the policy (e.g., the document that encodes the policy) may be altered to specify that the policy now allows read and write access to that resource.

By contrast, a "policy change" is the result of a policy edit and/or the difference between a first policy and a second policy, as a result of applying a policy edit. In the example described above, while the policy edit may add both read and write access to the specified resource, the policy change may only the be addition of the write access for the resource (because the read access had been previously allowed by the policy). Thus, a policy edit may propose granting or denying access to set of resources and may be an alteration to the policy representation while the corresponding policy change may be the changes to the permissions associated with the policy as a result of applying the policy edit.

In an embodiment, the policy management service may detect undesirable policy changes from a proposed policy edit by evaluating such changes against access control usage data. Access control usage data may comprise data records and/or metadata records resulting from requests for access to resources that may, in turn, be based on one or more permissions associated with one or more policies. For example, with a set of permissions for a user USER1, a request by USER1 to read from resource 12345 may cause the computer system to generate an access control usage data record of such a request and also that the request was allowed. Similarly, a request by USER1 to write to resource 12345 outside of permitted times (i.e., if USER1 is only allowed to write to resource 12345 at certain times) may cause the computer system to generate an access control usage data of such a request, that the request was denied, and the reason that the request was denied.

Such access control usage records may be stored in the policy repository or may be stored in a separate repository associated with the policy management service. Such records may then be collected, aggregated, and/or otherwise processed into a form that is usable by the policy management service to improve access control policies by evaluating recommended policy modifications based on the access control usage data and by issuing warnings and/or suggestions based on that evaluation. For example, repeated daily requests by USER1 to write to resource 12345 at around 9:45 AM (which could all be denied in this example) may be aggregated to produce a data item indicating that the required permission is not present. Based on this data item, the policy management service may generate a recommendation that USER1 be, for example, granted write access to resource 12345 until a time after 9:45 AM (or another time, such as 15 minutes before 9:45 AM to allow for variations in submission time).

Policy changes (also referred to as policy modifications) may be authored by a user and sent, in electronic format, to the policy management service. Such policy changes may be sent to the policy management service using application programming interface ("API") calls such as those used to author and/or edit policies. Policy changes may first be compared against usage data to verify whether the policies do not, for example, remove needed permissions from the policy and/or add missing, but unnecessary, permissions to the policy. Policy changes may be compared against usage data that is implicated by (i.e., has the same principal, resource, actions, conditions, or other such same records) the permissions associated with the policy changes. For example, a policy change that alters a permission for a certain resource implicates all usage data associated with that resource. Policy changes that are not verified because of, for example, they may cause potentially undesirable effects, may cause the policy management service to generate a warning to the user about the potentially undesirable effect of the policy change and/or the associated policy edit. Such policy changes may also cause the policy management service to generate a suggested remedial action such as, for example, reverting the policy changes and/or implementing other changes. In the event that the user proposing the policy edit approves the resulting policy change, the potentially undesirably policy changes may then be implemented. For example, policy changes may be processed using procedures such as procedures for verifying and/or approving policy changes, procedures for delaying implementation of policy changes, procedures for authorizing and authenticating users, and/or other such procedures.

An approved and implemented policy change may cause the policy management service to perform one or more actions to alter the access rights to one or more computing resources associated with an organization, according to the modified policy. Once the modified policy is implemented, new access information, including additions and removals of roles and access rights of a user, may be communicated to the policy management service. The policy management service may then alter permissions associated with the computing resources corresponding to the altered roles and access rights to enable (or disable) access by the user to interact with the computer resources. The policy management service may then begin to use the modified policy to generate new access control usage data and may evaluate further changes to the policy based on the new access control usage data.

FIG. 1 is an illustrative example of an environment 100 in which access control policy warnings and suggestions may be generated in accordance with an embodiment. Access control policies are collections of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345.

Access control policies may be maintained by a policy management service and may be stored in a policy repository. In an embodiment, a user with privileges for modifying permissions and/or for modifying a set of policies (e.g., an administrator or other such user with privileges for modifying a set of policies, also referred to as a "privileged user") of an organization may communicate with the policy management service using one or more API calls to request creation of policies, editing of policies, or deletion of policies. Such policy modification activities (e.g., creating and editing) may also be referred to herein as "authoring" a policy. The policies may, for example, be utilized to establish, for one or more users, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Access control policies may be authored in a default state such as, for example, denying all access or granting all access. Access control policies may also be authored based on organizational business needs and/or may be based on roles within that organization so that, for example, all software developers have the same access control policy. Access control policies may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or suboptimal for some other reason.

A policy management service 106 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend (described herein) may receive a request for access to resources and may generate a query to the policy management service based at least in part on information specified by the request.

The policy management service 106 may be one of a plurality of services provided by a computing resource service provider 104. In some embodiments, the policy management service is a distributed computer system configured to centrally manage policies for multiple services operated by the computing resource service provider 104. Requests for access to service resources (i.e., requests whose fulfillment involves access to the resources themselves and/or information about the resources) may be evaluated against one or more policies associated with the request and/or associated with the requester and those requests that are allowable based on those polices may be performed. API calls to create, edit, and/or delete policies may also be received by the policy management service. As policies may change, so too may the scope of requests that are allowable change. For example, an organization may have a default policy allowing reads from all storage resources of a certain class. Barring a specific policy restricting a certain user from performing such reads, the default policy would permit such reads by any user. A change to a default policy preventing all reads from that class of storage resource may prevent that certain user from reading from such resources, and may require that specific permissions be granted if that user required that access. Granting such permissions may require that the policy be edited to change the permissions. In some embodiments, actions that are attempted (e.g., reads from a storage resource) may be logged in a request log 112 along with details about the request including, but not limited to, the requester, the resource, the action, the result, and any conditions, decisions, or other metadata associated with the request.

A privileged user 118 may edit existing policies and may, for example, add permissions to the policy or remove permissions from the policy. The policy edits 102 may be provided to the policy management service 106 using, for example, an API call to the policy management service 106. The policy edits 102 may be used to determine the policy changes 108 that may have occurred as a result of the edit. In some embodiments, the policy changes 108 may be determined directly from the policy edits 102. For example, the policy edits 102 may include the proposed policy changes, which may be used to produce the policy changes 108. In some embodiments, the policy changes may be determined as a result of comparing an edited policy to a previously used policy. For example, the policy edits 102 may include a previous policy and a proposed new policy and the policy changes 108 may be determined by comparing the previous policy to the proposed new policy. As may be contemplated, the scope and content of the policy edits and the methods of deriving the policy changes described herein are merely illustrative examples and other such scopes or contents of the policy edits 102 and/or methods of deriving the policy changes may be considered as within the scope of the present disclosure.

The policy management service 106 may then evaluate the policy changes 114 by comparing the policy changes 108 against resource usage data in a request log 112 and/or against one or more current policies 110 to determine the resource usage data implicated by the policy changes. The policy changes 108 may specify one or more changes that may be made to one or more permissions associated with the policy. The policy management service 106 may evaluate the policy changes 114 by scanning the usage data from the request log to determine whether any of the policy changes, if implemented, would change a previous result in the usage data. For example, a policy change may be proposed to remove write access to a resource. Resource usage data from the request log 112 may show that a previous request was made to write to that resource and that request (based on the previous policy) was allowed. The proposed policy change would, if implemented, change that request from being allowed to being denied. Such a change may trigger a warning or suggestion. As a similar example, a policy change may be proposed to add write access to a resource. Resource usage data from the request log 112 may show that a previous request was made to write to that resource and that request (based on the previous policy) was denied. Such a change from denial to allowance may also, in some embodiments, trigger a warning or suggestion. The lack of usage data may also be used as the basis for warnings and/or suggestions. For example, a policy change that proposed to add write access to a resource may be compared against the usage data and, in the event that no previous requests to write to that resource are found in the resource usage data, a warning about the possibly unneeded permission or a suggestion indicating another change that does not add the permission may be issued.

In some embodiments, warnings and/or suggestions may also be issued based on secondary considerations associated with the usage data. For example, the policy management service 106 may be configured such that a request to add a permission for access to a resource that was previously not allowed is treated as a beneficial change. However, if the resource is especially sensitive or access to the resource is only granted to a certain type of user, the policy management service may still issue a warning against adding access to that service.

The resource usage data in the request log 112 may be produced based at least in part on one or more requests for access to computing resources. As an example of how requests may be logged in a request log 112, a user may (e.g., through API calls) submit requests to cause the computing resource service provider 104 to perform one or more operations involving access to a storage resource (e.g., virtual storage device or file system) associated with a computer system provided by a computing resource service provider 104, where access to the storage resource may involve the storage resource itself and/or information associated with the storage resource. In the example illustrated in FIG. 1, the request log 112 is shown as a component of the policy management service 106. In some embodiments, the request log may managed outside of the policy management service 106 and may, for example, be provided as part of another service provided by the computing resource service provider 104 or may be provided by some other provider. Requests for resource usage data from the request log may be transmitted as queries, and such queries may be based on the proposed policy changes. For example, a policy change that would add access for a principal to a resource may cause the policy management service to query the request log for usage data implicated by that permission (i.e., usage data associated with that principal's access to that resource). The results of such queries may be provided in one or more data structures and may be optimized for searching by the policy management service as described below.

With the example of a file system, the requests may include, for example, a request to list the contents of a file system on the storage resource, a request to change to a subdirectory of the file system, a request to read the contents of a file stored in the subdirectory, and a request to make a change to the contents of that file. Each request may be logged in the request log 112 and the request log entry may specify the requester (e.g., a principal that authorized the request), the resource, the operation (e.g., list the contents of the file system, change to the subdirectory, the file read, and the file write), the permissions associated with the request, conditions relevant to the permissions, and the result of the request (i.e., whether it was allowed, denied, or there was some other result). In some embodiments, each of the operations may be associated with one or more entries in the request log 112.

The policy management service 106 may then evaluate the policy changes 114 by comparing one or more of the policy changes 108 against the resource usage data in the request log 112 to determine whether the policy changes include permission changes to cause the denial of needed permissions, to cause the granting of unneeded permissions, or to perform some other operation to render the edited policy less efficient and/or ideal. For example, a user may not have access to a certain resource. A policy edit and/or the resulting policy change from a requester (which may be the same as the user) that adds permission for a user to access that certain resource may be compared against one or more resource usage log entries (also referred to herein as "records") in the request log 112 to determine whether the user has ever attempted to access that resource. Different responses (e.g., warnings and/or suggestions) may be returned to the requester as a result of that comparison. For example, if the user has never attempted to access the resource, the policy management service 106 may issue a policy change warning 116 indicating a potential conflict between the policy change and previously existing permissions that informs the requester that the permission may not be necessary for that user. If the user has not attempted to access the resource recently, a different policy change warning 116 may be issued (e.g., a less urgent warning). If the user has attempted to access the resource frequently and/or recently, another different policy change warning 116 may be issued (e.g., a suggestion to allow the policy change or no warning at all).

The policy change warning 116 may be in the form of an alert, an email, a popup (i.e., within a user interface, such as a modal dialogue box), or some other alert. The policy change warning 116 may also be include one or more suggestions such as, for example, alternate policy edits, alternate policy changes, alternate policies, or related permissions that may be granted. In some embodiments, the requester may be allowed to accept the suggestion, ignore the suggestion, ignore the warning, or perform some other action in response to the warning. In some embodiments, the requester may need to obtain additional permission to ignore the suggestion and/or ignore the warning.

In another example, the user may have access to a resource and may have certain permissions associated with access to that resource (e.g., read access, write access, etc.). A policy edit and/or the resulting policy change from a requester (which may be the same as the user) that removes one or more of these permissions for the user to access that certain resource may be compared against one or more resource usage records in the request log 112 to determine, for example, when, how, and how frequently the user has attempted to access that resource. Frequent and/or recent accesses that used the permission that is proposed for removal may generate warnings of varying urgency and/or accompanying suggestions related to not removing that permission, as described below.

Policy edits that do not generate any warnings, and/or policy edits that are accepted by the user, may then be applied to the policy to produce a new current policy for that user. Subsequent policy edits may then be compared against resource usage requests associated with the new current policy. For example, if a policy edit subsequently arrives for a policy that was previously edited, the new policy may be evaluated based on previously applied policy changes 114 and using the request log 112 data associated with the edited policy to determine whether any warnings and/or suggestions should be issued. While the request log 112 illustrated in FIG. 1 is shown within the policy management service 106, it should be noted that the request log 112 may be outside of the policy management service 106 and may be provided as part of a separate service, may be a data repository, may be an aggregation of request log data, or may be provided to the policy management service 106 using some other method.

In some embodiments, entries in the request log 112 may be further processed by the policy management service 106 and/or by a service associated with the policy management service 106 to combine, aggregate, and/or analyze the access requests. In such embodiments, the processing of the entries in the request log may be performed in an effort to reduce the volume of data that must be analyzed to evaluate the policy usage. For example, an organization may have thousands of requesters, making hundreds of requests an hour for access to tens of thousands of computing resources. In such an example, millions of request log entries may be generated every day and the data processing and/or aggregation of such request log entries may improve the efficiency of the process to evaluate the policy changes 114.

Figure 2:
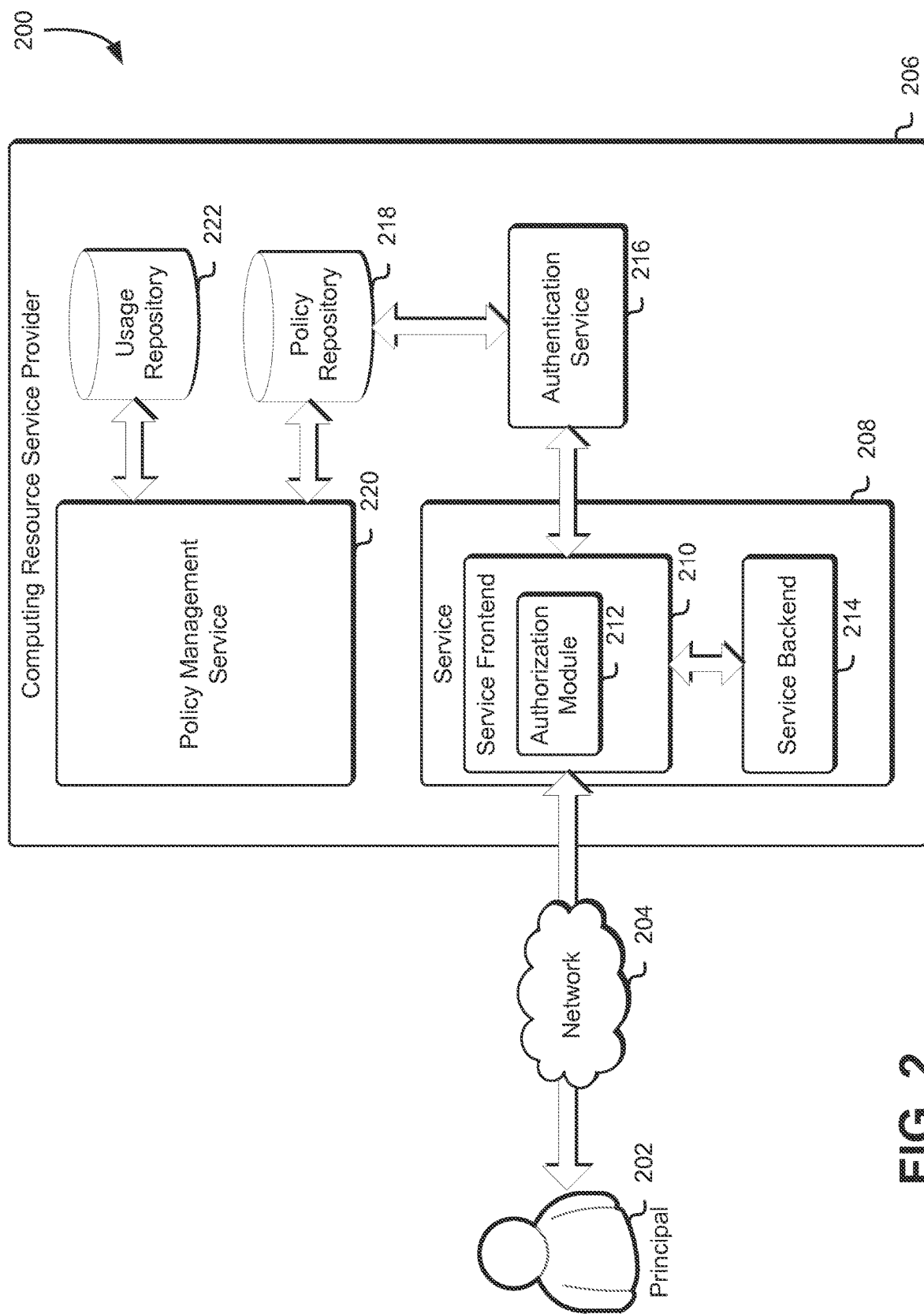
FIG. 2 illustrates an example environment in which access control policies may be managed in accordance with an embodiment.

FIG. 2 is an illustrative example of an environment 200 in which access control policies may be managed in accordance with an embodiment. In an embodiment, a principal 202 may use a computing device to communicate over a network 204 with a computing resource service provider 206. Communications between the computing resource service provider 206 and the principal 202 may, for instance, be for the purpose of accessing a service 208 operated by the computing resource service provider 206, which may be one of many services operated by the computing resource service provider 206. The service 208 may comprise a service frontend 210 and a service backend 214. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 208 may be received by a service frontend 210, which, in some examples, comprises a web server configured to receive such requests and to process them according to one or more policies associated with the service 208. The request for access to the service 208 may be a digitally signed request and, as a result, may be provided with a digital signature. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202. However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate.

Upon successful authentication of a request, the authentication service 216 may then obtain policies applicable to the request. A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220, which may be the policy management service discussed above in connection with FIG. 1. The policy management service 220 may also obtain usage history associated with the policy and/or the permissions associated with the policy by transmitting a query to a usage repository 222. The usage repository may include records of previous access control usage requests such as the requests obtained from request log 112 described herein in connection with FIG. 1. The records of previous access control usage requests obtained from, for example, the request log, may be referred to herein as "obtained information" or as "obtained information records" or simply as "records."

The query to the policy repository 218 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request). The query to the usage repository 222 may be a request comprising information sufficient to determine past usage of permissions (i.e., requests for access managed by one or more permissions) associated with the set of policies. The query to the usage repository 222 may, for example, include copies of the policies and/or permissions, a copy of the request, parameters, and/or metadata associated with the policies, permissions, or request, and/or other such data and/or metadata. The policy repository 218 and/or the usage repository 222 may be databases or other systems operable to process queries. The policy repository 218 and/or the usage repository 222 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 216 may provide an authentication response and, if applicable, the obtained policies back to the service frontend 210. The authentication response may indicate whether the response was successfully authenticated. The service frontend 210 may then check whether the fulfillment of the request for access to the service 208 would comply with the obtained policies using an authorization module 212. An authorization module 212 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

Finally, if the fulfillment of the request for access to the service 208 complies with the applicable obtained policies, the service frontend 210 may fulfill the request using the service backend 214. A service backend 214 may be a component of the service configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

Figure 3:
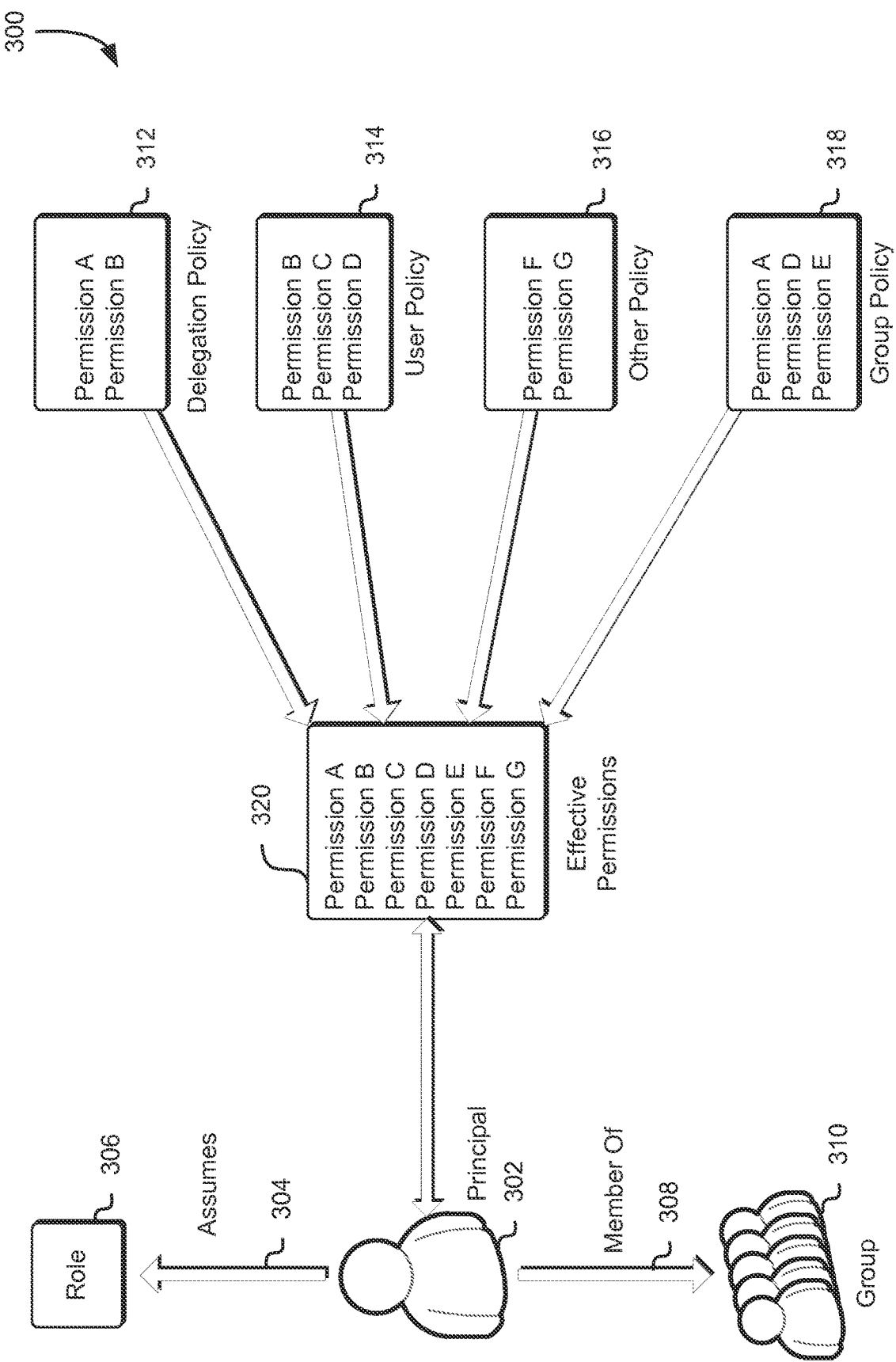
FIG. 3 illustrates an example diagram in which permissions associated with access control policies may be consolidated and altered in accordance with an embodiment.

FIG. 3 is an illustrative example of a diagram 300 illustrating relationships between various aspects of the present disclosure in which permissions associated with access control policies may be consolidated in accordance with an embodiment. A principal 302 such as the principal 202 described herein in connection with FIG. 2 may have a set of effective permissions 320, which may be an aggregate of the permissions granted by one or more policies associated with that principal's access to computing resources. The set of effective permissions 320 may specify a plurality of permissions which detail resources the principal 302 may access, which resources the principal 302 may not access, and under which conditions access to those resources may be allowed (or granted) or denied. For example, a set of effective permissions may include one or more permissions that are associated with the principal, and one or more permissions that come from a different source such as, for example, a group policy, a delegation policy, roles assumed by the principal, organizational policies, or default policies. With respect to a policy, the policy's effective permissions may be those permissions that the policy explicitly or implicitly defines. For instance, a policy may explicitly grant a principal a set of permissions to perform a set of actions in connection with a resource. As another example, a policy may implicitly grant permissions to principals by granting permissions to a group (of which the principals are a member). The effective permissions of a policy may change over time. For example, a policy may be a role policy and principals able to assume the role may change over time despite the policy remaining static. As a result, effective permissions may change as the principals authorized to assume the role change. In other words, an effective permission is an access right of a principal to perform an action on a resource. A policy may grant effective permissions explicitly (i.e., by specifying the principal, the action, and the resource) and/or implicitly (i.e., by specifying the permissions in a way that leaves one or more of the principal, action, or resource unspecified explicitly).

In an embodiment where a default policy is to deny access to resources, the permissions may specify which resources are allowed. In an embodiment where the default policy is to allow access to resources, the permissions may specify access to the resources which are not explicitly denied. In an embodiment with some other default policy, the permissions may specify a combination of allowed and denied resource access. In some embodiments, the set of effective permissions 320 may be an aggregation of permissions for a particular resource and/or class of resources. In some embodiments, the set of effective permissions 320 may be an aggregation of permissions for multiple resources (e.g., an aggregation of permissions associated with all resources managed by a service for the user, an aggregation of permissions associated with a user account, or some other aggregation of permissions).

The set of effective permissions 320 may specify a combination or aggregation of permissions based on aspects of the principal. For example, if the principal 302 is a user, then the set of effective permissions 320 may specify one or more user policy permissions 314. User policy permissions 314 may include permissions related to the type of the principal 302 (i.e., a "user," a "group," or an "organization") and may also include permissions associated with a specific set of credentials associated with the identity of the principal 302.

In addition to permissions related to the class and/or the identity of the principal 302, the set of effective permissions 320 may specify one or more delegation policy permissions 312 as a result of the principal 302 assuming 304 one or more roles 306 specified within an organization. As an example, a principal 302 may be a software developer and may assume 304 a software developer role in his or her day-to-day activities. A software developer role may specify a set of delegation policy permissions 312 that are included in the set of effective permissions 320 associated with the principal 302. There may be some overlap in the user policy permissions 314 and the delegation policy permissions 312 (e.g., "Permission B"). There may also be conflicts between the user policy permissions 314 and the delegation policy permissions 312. For example, "Permission A" in delegation policy permissions 312 may grant access to a resource at all times, while "Permission C" in user policy permissions 314 may deny such access. In the event of such conflicts, a default policy and/or a default policy conflict resolution standard may prevail (i.e., to prefer denial or to prefer granting).

Similarly, the set of effective permissions 320 may specify one or more group policy permissions 318 as a result of a principal 302 being a member of 308 one or more groups 310 (e.g., a production group). The set of effective permissions 320 may also specify one or more other policy permissions 316 such as those associated with default policies, organizational policies, policies associated with certain applications, policies associated with heightened security conditions, temporary polices, or other such policies.

A principal 302 may also assume multiple roles, and thus multiple sets of role policy permissions. For example, the principal 302 that assumes a software developer role in his or her day-to-day activities may, at some point during his or her day, need more permissions such as those which may be associated with a system administrator role. In such an example, the principal may temporarily assume a system administrator role, perform one or more privileged operations granted by that role, and then may release that role, thereby returning his or her policy to the less privileged set of permissions. As may be contemplated, the types of roles and the associated permissions described in association with those roles are illustrative examples and other types of roles and associated positions may be considered as within the scope of the present disclosure.

Permissions associated with the set of effective permissions 320 may be altered for the principal 302 by adding and/or removing permissions (i.e., as a result of API calls to a policy management service) from the delegation policy permissions 312, from the user policy permissions 314, from the group policy permissions 318, from the other policy permissions 316, or from other such groups of permissions. For example, removing "Permission E" from the set of effective permissions 320 may be accomplished by removing that permission from the group policy permissions 318. Such a removal may also remove that permission from any other principals who are members of that group which may or may not be a desirable effect. Redundant permissions may be removed from a policy. For example, users with user policy permissions 314 and with delegation policy permissions 312 have "Permission B" granted by both policies and as such, "Permission B" may be removed from either delegation policy permissions 312 or user policy permissions 314 without altering the permissions in the set of effective permissions 320. In both of these examples, other policy modification actions may also accomplish the same result (e.g., altering group membership and/or role assignments as described herein).

For example, the principal may be removed from the group (rather than altering the permissions of the group) and, because in the example illustrated in FIG. 3, "Permission A" and "Permission D" are granted by other policy permissions, the result would be to remove "Permission E" from the principal without altering the permissions of other principals. Similarly, permissions for a principal may be altered by adding the principal to a new group with different permissions (i.e., a newly created and/or previously specified group), assuming and/or releasing roles from the principal, altering roles, splitting groups based on the principals and/or the desired permissions, or other such actions. For example, a group may have ten members and may grant five permissions. Five of the group members may be suited to having the first four permissions and five of the group members may be suited to having the last three permissions. Splitting this group into two groups, each of which has the appropriate permissions and then making the appropriate principals members of the appropriate groups may make the permissions more optimal for each of the members.

Figure 4:
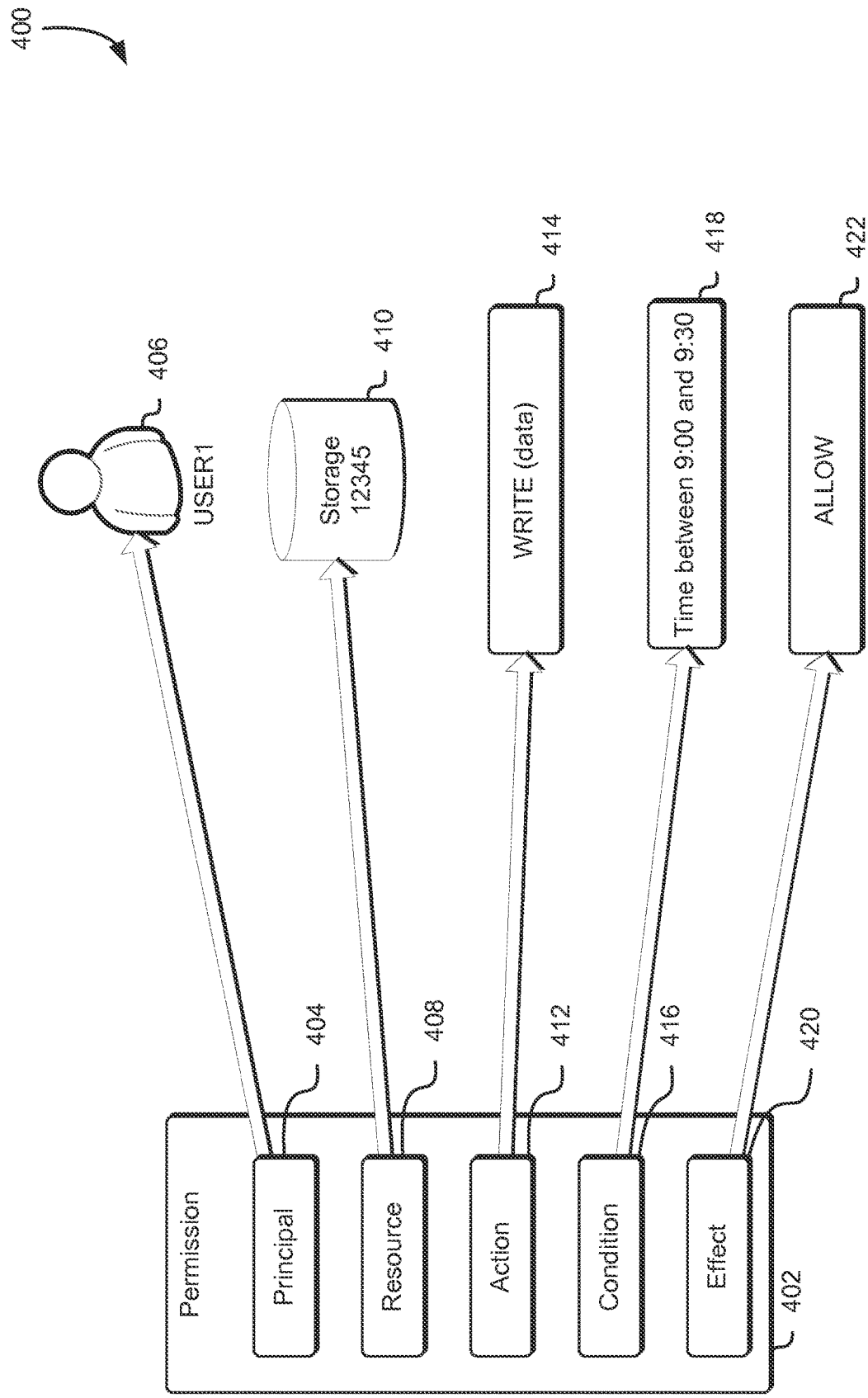
FIG. 4 illustrates an example diagram in which a permission associated with an access control policy is illustrated in accordance with an embodiment.

FIG. 4 is an illustrative example of a diagram 400 illustrating relationships between various aspects of the present disclosure in which a permission associated with an access control policy is illustrated in accordance with an embodiment. In an embodiment, a permission 402 may specify a principal 404, a resource 408, an action 412, a condition 416, and an effect 420. In some embodiments, a permission may also specify a plurality of one or more of these elements such as, for example, a set or class of users, a collection of resources, several different actions, and/or multiple conditions.

The principal 404 may be a user, a group, an organization, a role, or a collection and/or combination of these or other such entities. A principal 404 may be any entity that is capable of submitting API calls that cause an action associated with a resource to be performed and/or any entity to which permissions associated with a resource may be granted. In the example permission 402 illustrated in FIG. 4, the principal 404 is a user 406 identified as "USER1." The action 412 may be any action that may be performed in association with the resource and may, for example, be identified by a type of API call, a library call, a program, process, series of steps, a workflow, or some other such action. For example, an action may be a set of operations that may be performed as part of the fulfillment of an API call to, for example, a webservice. The actions that are performed may be a subset of those actions and/or may be a single operation. The operations may also be performed in a defined order, may be repeated, or may be shared between a plurality of API calls. In the example permission 402 illustrated in FIG. 4, the action is an API call to write data to the resource. The permission 402 illustrated in FIG. 4 may be one of a plurality of permissions specified by user policy permissions, such as those described in connection with FIG. 3. The example permission 402 illustrated in FIG. 4 further specifies a storage resource 410 for the resource 408, a data write API call 414 for the action 412, a time condition 418 for the condition 416, and an ALLOW effect 422 for the effect 420. The example permission thus specifies that "USER1 is ALLOWED to WRITE to 12345 between 9:00 AND 9:30 AM."

Figure 5:
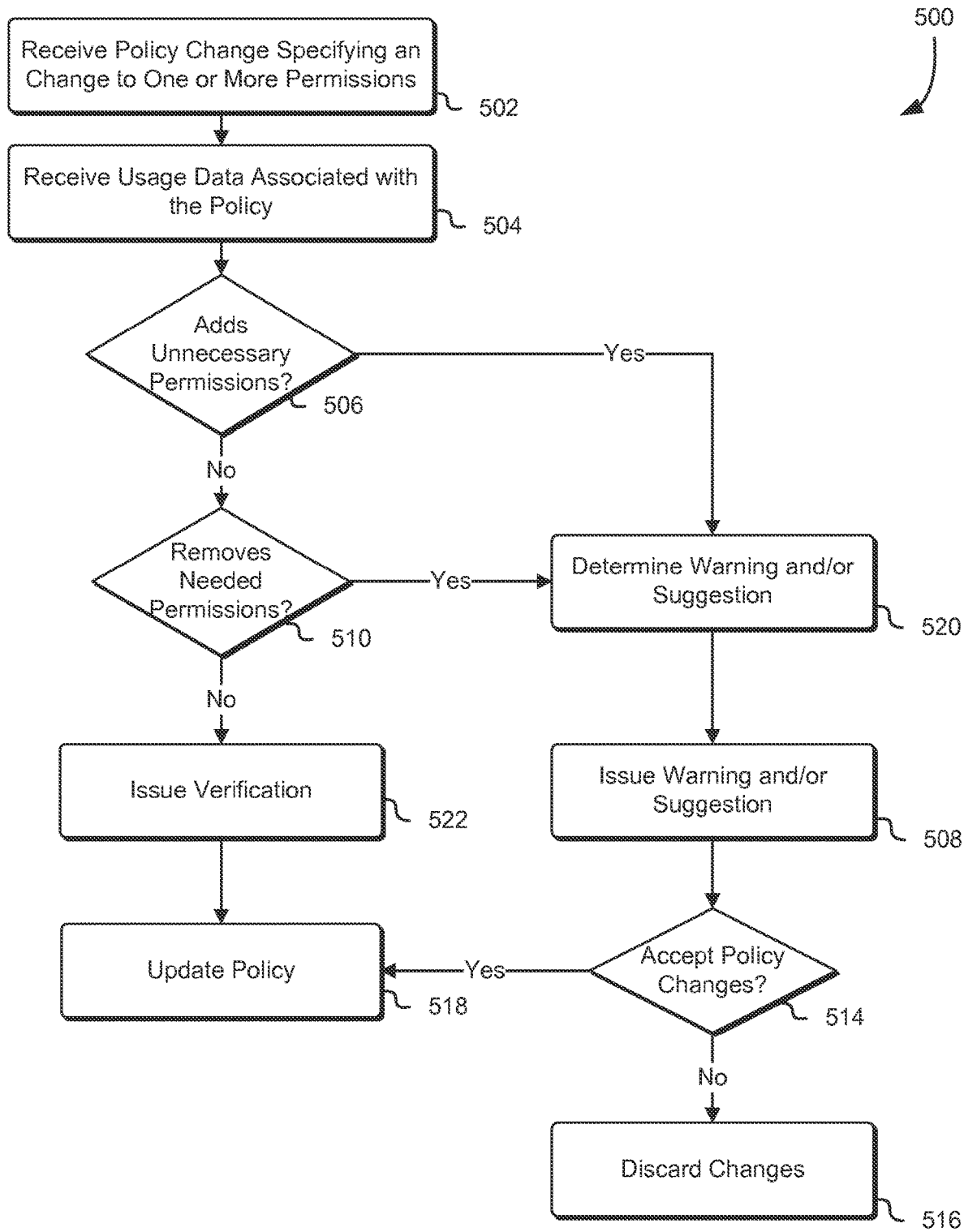
FIG. 5 illustrates an example of a process for generating access control policy warnings and suggestions in accordance with an embodiment.

FIG. 5 is an example of a process 500 for generating access control policy warnings and suggestions in accordance with an embodiment. A policy management service such as the policy management service 106 described in connection with FIG. 1, or a component thereof, such as a web server, may perform the process 500 illustrated in FIG. 5.

A policy management service may first receive a policy change specifying a change to one or more permissions associated with a policy 502. The policy edit (or the corresponding proposed access control policy change) may be received from a requester by that requester making, for example, one or more API calls to a web server of the policy management service. The policy management service may next receive usage data associated with the policy 504 from, for example, a repository of such usage data. In some embodiments, the policy management service may request the usage data from the repository based upon the policy. The usage data may be data and/or metadata from one or more resource usage logs which may indicate usage of permissions associated with the policy 504 and/or may include a set of data from a repository of consolidated data from such resource usage logs.

The policy management service may next examine the usage data as it relates to the proposed access control policy change (also referred to herein as a "policy change" or a "proposed policy change") to determine whether the policy change proposes to add unnecessary permissions 506 to the policy. Unnecessary permissions may include permissions that are not actually used (according to the usage log), may include permissions that should not be granted, and/or may include permissions that are duplicates of existing permissions. For example, an application may have permissions it does not need and/or should not have based upon its functionality. Such permissions may be determined by the policy management service as unnecessary. In the event that a request to add unnecessary permissions is detected, the policy management service may determine whether to issue one or more warnings and/or suggestions 520 as described above. The policy management service may also issue one or more of the determined warnings and/or suggestions 508 to the requester. The issued warnings may be based on the request and may indicate any conflicts between the request and the usage data. The issued suggestions may include one or more proposed alternative actions (also referred to herein as a "proposed alternative set of changes") such as, for example, a removing permissions, altering groups, altering roles, splitting groups, changing group membership, changing role assignments, or a combination of these and/or other such suggested actions, as described above in connection with FIG. 3.

The policy management service may next examine the usage data as it relates to the policy change to determine whether the policy change proposes to remove needed permissions 510 from the policy. Needed permissions may be determined from usage data by, for example, detecting the presence of one or more denied requests in the usage data logs. In the event that a request to remove needed permissions is detected, the policy management service may determine whether to issue one or more warnings and/or suggestions 520 as described above and as also described above, a warning and/or a suggestion 508 may be issued to the requester. If the proposed policy change that specifies one or more changes to one or more permissions includes changes consistent with the usage data, the policy management service may issue a verification 522 to the requester. A verification may be, for instance, a message that indicates that the proposed policy change is consistent with the usage data. For example, if the request is for a policy change adding permissions that the principal needed (based on the usage data), that were previously not present in the policy, and that are not precluded for security or some other such reason (e.g., conflict with another policy), then the requester may receive a verification that the change is beneficial. The warnings, suggestions, and verifications provided to the requester (also referred to also as "policy change feedback") may be provided to the requester to be displayed on a user interface as described below.

Based at least in part on the warnings and/or suggestions, and also based at least in part on one or more responses to those warnings and/or suggestions, the policy management service may then determine whether to accept the policy changes 514 as described above. In the event that one or more of the policy changes are not approved, those changes may be discarded 516. If at least a portion of the changes are approved, the policy may be updated 518 and thus may become operable, thereby granting a new set of permissions.

In some embodiments, the approval of the altered policy and/or the approval of any suggestions may require additional approval. For example, approval of the altered policy may be requested from a user of the system such as a privileged user. In another example, a set of suggestion approvals may be sent to the user of the system such as a privileged user with privileges to approve policy changes. The suggestion approvals may, through a user interface, request approval, from the user, for one or more of the suggestions. In such embodiments, additional notifications (or alerts) may be generated in the event that the user does not heed the warnings and/or does not approve the suggestions. Note that, in some embodiments, approval may be implicit and, for instance, a suggestion approval may specify that a change to a policy will go into effect unless action is taken by a certain time. In some embodiments, approval of the policy may be automatic (i.e., may be applied without requiring explicit approval of the specific altered policy) based on one or more policy acceptance criteria specified in association with the system. In such embodiments, the policy may become active (i.e., may replace the previous policy) without approval because, for example, the system is configured to automatically apply policy changes based on one or more criteria for accepting recommended policy changes. In some embodiments, a portion of the recommended policy changes may be approved and a portion may be discarded. In some embodiments, recommended policy changes may be rated and ranked according to one or more factors including, but not limited to, the destructiveness of the API associated with the permissions, the complexity of the policy, the permissiveness of the policy, conformance to default policy behavior, comparison to policies and/or usage patterns of other organizations, predicted effects of the policy changes, or other such factors. Such ratings and rankings are described in more detail below. Recommended policy changes may be presented for approval based on the ratings and rankings and may also be automatically approved and/or automatically denied based at least in part on these ratings and rankings.

Figure 6:
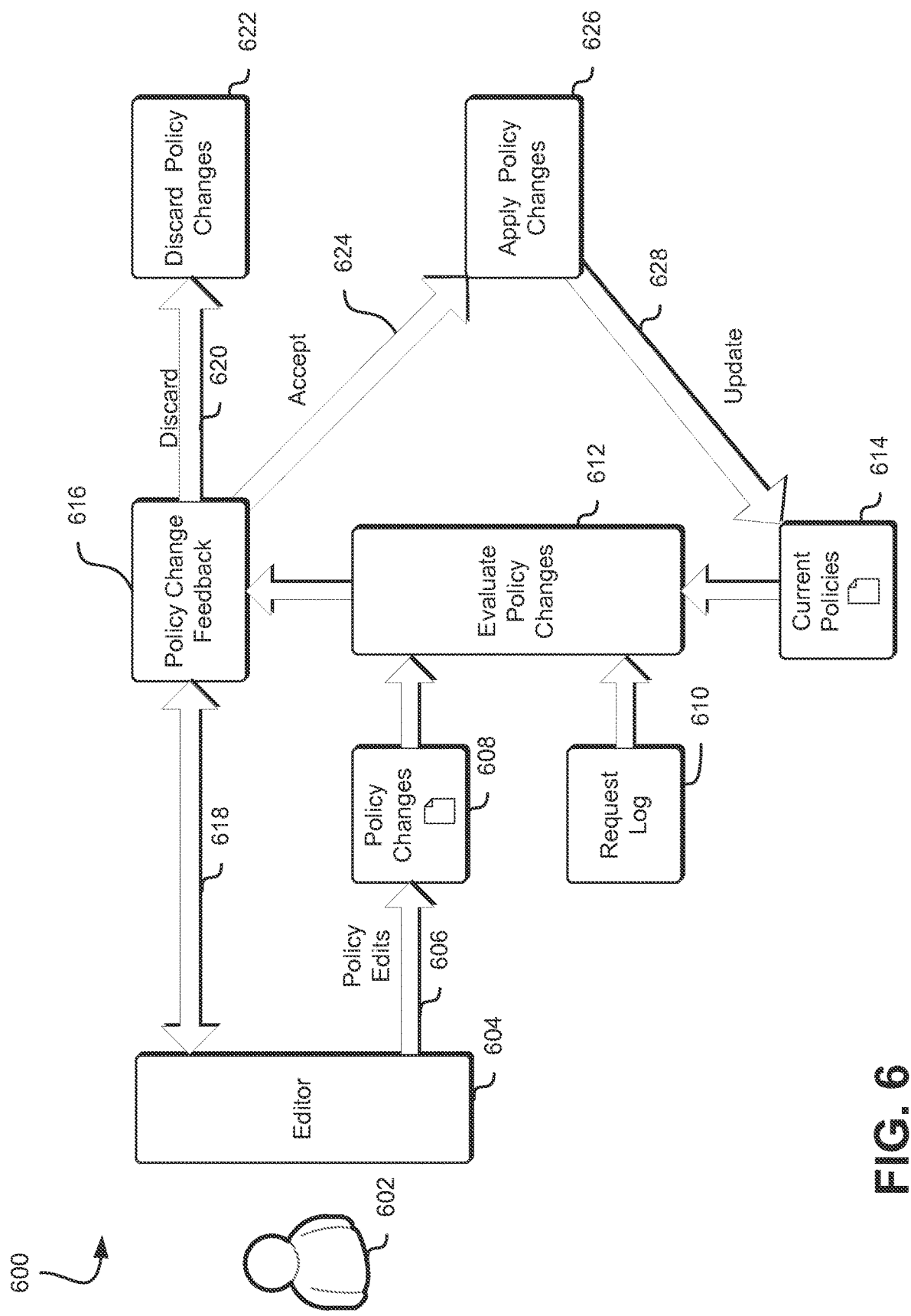
FIG. 6 illustrates an example environment in which access control policy warnings and suggestions may be generated and processed in accordance with an embodiment.

FIG. 6 is an illustrative example of an environment 600 in which access control policy warnings and suggestions may be generated and processed in accordance with an embodiment. A requester 602 may use an editor 604 (e.g., a policy editor) to generate one or more policy edits 606 as described above. Policy changes 608 may be derived from the policy edits 606 and may be evaluated 612 using request log data 610 and/or one or more current policies 614. As a result of the policy edits 606 being evaluated 612 one or more policy change feedback responses 616 may be generated. The policy change feedback responses 616 may include a simple warning that the policy change may have a negative impact or they may include more detailed information. The policy change feedback responses 616 may also include suggestions and/or verifications as described above. A policy change feedback response may also include an indicator of the potential severity of the impact of the change based on a ranking of the possible impact (i.e., by gathering past usage data associated with the permissions and using that past usage data to generate potential impact information). In such an example, the removal of a permission that is infrequently used may have a moderate potential impact while the removal of a permission that is frequently used and/or has been used recently may have a high potential impact. In some embodiments, the impact may be determined based on metadata associated with the past usage data such as the time of the request for access (also referred to herein as a "timestamp"), the location where the request was generated, the location of the resource, the frequency of used permissions, the presence (or absence) of used permissions, or other metadata associated with the request for access.

The policy change feedback responses 616 may include one or more suggestions. Such suggestions may also be referred to as a "proposed alternative set of changes" as they may be based on the policy changes 608. The proposed alternative set of changes may be determined based on the evaluation of policy changes as described above. For example, a proposed policy change that adds permissions not used in the past, based on the usage data, may cause the policy management service to generate a less complex proposed alternative change to not add that permission. The policy management service may also generate a more complex proposed alternative change to add one or more lesser permissions that would be encompassed by the permission. For example, a proposed policy change to add write access by a principal to each resource in a set of resources. The proposed policy change may be compared to usage data and that comparison may indicate that the principal only needs write access to a subset of the set of resources. The proposed alternative change might be to grant write access only to the subset of the set of resources. Similarly, a proposed policy change to remove all access to a resource where some access is actually needed may generate a proposed alternative change to not remove such access, or may generate a proposed alternative change to remove everything except the access that is actually needed.

The proposed alternative set of changes may be determined by comparing the permissions being granted and/or removed by the proposed policy change to the usage data implicated by those permission changes, determining if the scope of changes is too extensive (i.e., either adding to many permissions or removing too many permissions), and proposing an alternative set of changes that corresponds to a less extensive scope of changes. For example, a policy change that changes the permissions for a principal from read and write access to a logical data container (e.g., a file system, a folder in a file system, a data storage system, an identifier used to associate multiple data objects (also referred to as a "bucket") or some other logical data container) to read-only access to that logical data container may be proposed. The proposed policy change removing write permissions associated with all objects stored in that logical data container may be compared against usage data for the logical data container and also may be compared against usage data for the objects stored in the logical data container. If the second comparison reveals that the principal does not need write access to all of the objects in the logical data container, but does need write access to some of the objects in the logical data container (i.e., if there are twenty objects in the logical data container and the principal only needs write access to two of them), an alternative set of changes may be proposed in response to the policy change, suggesting that write access be retained for the objects that the principal needs write access to, and removed for the other objects. Similar proposed sets of alternative changes may be proposed for other resources including, but not limited to, virtual machines, data stores, network access, hardware access, security groups, and databases.

In some embodiments, a permission may encompass other permissions. For example, a first permission may grant all access to a set of resources. The first permission may be considered as a set of second permissions each of which grants all access to a single resource of the set of resources. Each second permission of the set of second permissions may further be considered as, for example, a permission to read from the single resource, a permission to write to the single resource, a permission to create the given resource, and a permission to destroy the given resource. In such embodiments, changes to the first permission may impact all of the sub-permissions, and may only be evaluated if the policy management service is provided with information indicating the relationship between the permissions. The policy management service may, for example, be provided by a tree of permission relationships, or by a hash table indicated permission relationships, or by a matrix of permission relationships, or by some other representation. The permission relationships may be used by the policy management service to evaluate the policy changes as described herein.

The potential impact information may include a scoring system for the impacts, a weighting system for the impacts, a combination (e.g., a linear combination or a weighted linear combination) of the impacts, or other methods of determining the potential impact information. For example, a change that effects a permission to list information in a resource (with, for example, a low potential impact score of 0.2), that is infrequently used (with, for example, a low potential impact score of 0.3), but that has been recently used (with, for example, a high potential impact score of 0.7) may have a resulting potential impact score of 0.4, which may be included with the potential impact information and which may be used to generate policy change warnings. The policy change warnings may also include suggestions to remediate the policy change including, but not limited to, alternative policy change recommendations, suggested actions for adjusting user groups and/or roles, suggested alterations to default permissions for a resource, or other such suggestions. Such suggestions may also be based on the potential impact information and/or on the generated policy change warnings. For example, a policy change warning with potential impact information specifying a high risk of a negative impact associated with implementing the change may only include a suggestion to not implement the change, as other suggestions may not adequately address the high risk.

A requestor may be editing a policy using, for example, a policy editor and may submit the edits for approval. The submission for approval may occur as a result of clicking on a button in a user interface or may occur automatically as the policy is edited. Prior to submitting the edits for approval, a policy management service may evaluate the edits using the service described herein and may issue one or more warnings and/or suggestions. The requester may then evaluate each of the warnings and/or suggestions and determine whether to heed the warning, ignore the warning, follow the suggestion, or not follow the suggestion. A requester that chooses to heed the warning and/or follow the suggestion may do so by reverting the proposed policy change associated with the warning and/or by taking one or more mitigating actions associated with the suggestion. A requester that chooses to ignore the warning and/or not follow the suggestion may do so by approving the proposed policy change.

If the requester chooses to heed the warnings and/or suggestions and thus chooses to discard 620 one or more of the policy changes, the policy changes may be discarded 622 by, for example, undoing the changes, reverting the policy, or by not applying the changes. If the requester chooses to not heed the warnings and/or suggestions and thus chooses to accept 624 one or more of the policy changes, the policy changes may be applied 626 by, for example, performing one or more actions to update 628 the policies to produce new current policies 614. In an embodiment, policy changes may be partially accepted and may be partially discarded when, for example, parts of the policy changes do not generate any warnings or when, for example, the requester chooses to accept a portion of the policy changes and discard a portion of the policy changes.

In some embodiments, policy changes may undergo additional approval processes such as, for example, sending alerts to administrators, delaying implementation until secondary approval is obtained, running simulations of the new policies in test systems, or other such approval processes. In such embodiments, an indicator of whether the requester heeded policy warnings, ignored policy warnings, accepted policy suggestions, or rejected policy rejections may be included with the proposed policy change. In such embodiments, an indicator of the impact of the policy change may also be included with the policy change. The additional indicators may cause alterations in the additional policy approval processes. For example, a policy change with a high impact where the warning was ignored may undergo additional scrutiny in the additional approval process, allowing an administrator or some other privileged user the opportunity to heed the warning and revert the proposed policy change.

Figure 7:
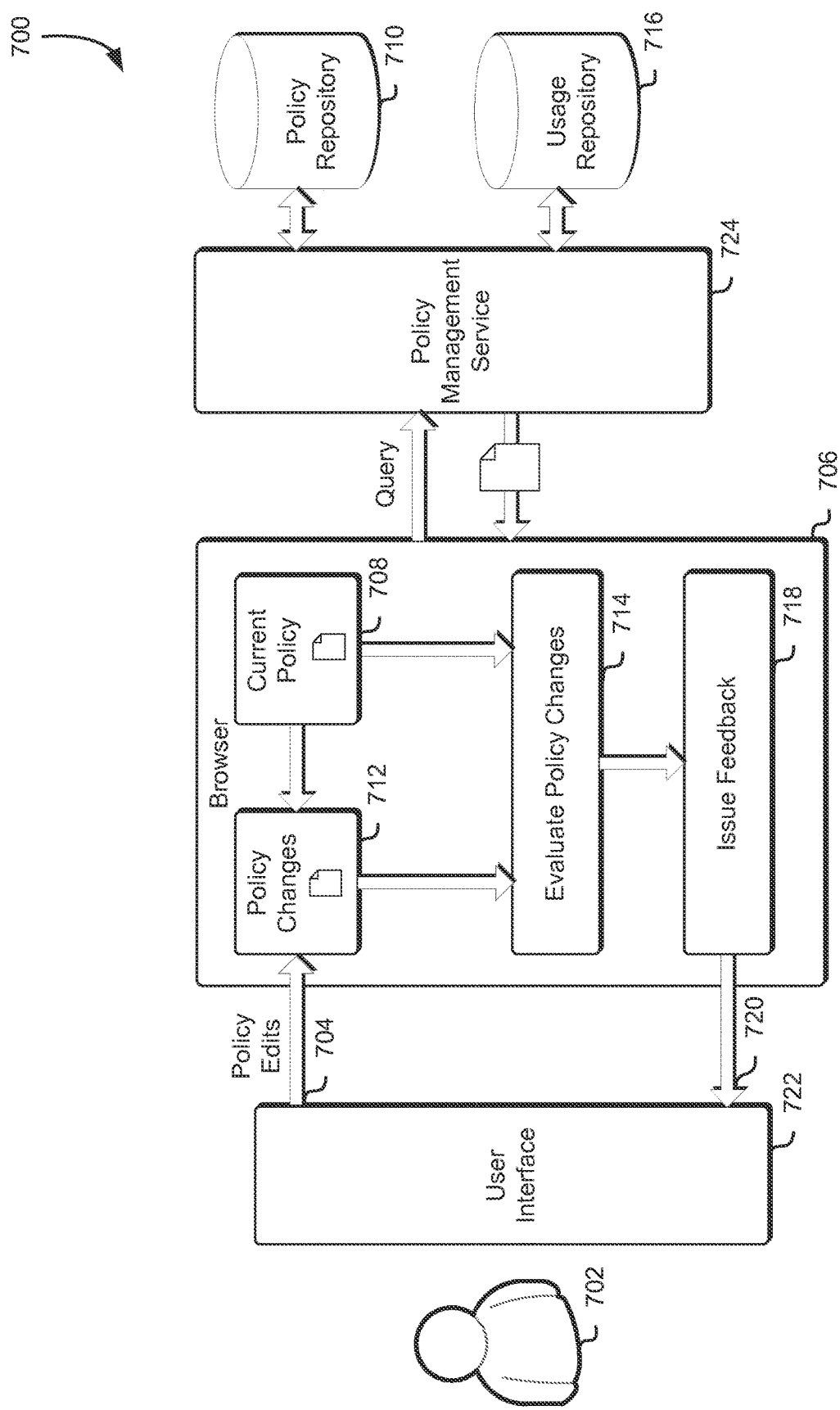
FIG. 7 illustrates an example diagram in which access control policy warnings and suggestions may be managed in accordance with an embodiment.

FIG. 7 is an illustrative example of a diagram 700 illustrating relationships between various aspects of the present disclosure in which access control policy warnings and suggestions may be managed in accordance with an embodiment. A requester 702 may generate one or more policy edits 704 as described above. The policy edits may be generated using a user interface 722, which may be configured to load policies, display policies, allow policy edits, submit policy edits, display warnings and/or suggestions, and perform various actions in response to the warnings and/or suggestions. In some embodiments, the user interface 722 may be a component of a browser 706. In some embodiments, the user interface 722 may be a separate component or application. The example illustrated in FIG. 7 shows the user interface 722 as a separate component or application. The browser 706 may be configured to retrieve the current policy 708 from a policy repository 710 and determine the policy changes 712 based on the policy edits 704. In an embodiment, the current policy 708 may be included with the policy edits 704. The browser 706 (or a component of the browser) may then be configured to evaluate the policy changes 714 based on policy usage data retrieved from the usage repository 716, the policy changes 712, and/or the current policy 708.

The policy usage data and/or the current policy may be retrieved as the result of one or more queries issued by a component of the browser 706 to a policy management service 724 as described above. The policy management service 724 may then receive data from the policy repository 710 and the usage repository 716 as described above. The data from the usage repository 716 may be received by the policy management service 724 in a raw form (i.e., as a set of log entries or records as stored in the usage repository 716) and may be processed by the policy management service 724 to better facilitate the process to evaluate the policy changes 714. For example, the policy management service 724 may index the usage data, may sort the usage data, may compress the usage data, or may perform other operations to make the data processing more efficient. In some embodiments, the usage data in the usage repository may already be indexed, sorted, and/or compressed (i.e., such operations may be performed when the data is stored) before the policy management service 724 retrieves the usage data. Additionally, the usage data may be provided to the browser 706 in a space efficient manner such as, for example, by further compressing it, by storing it in a hash table, by using a Bloom filter to efficiently present the data, or by some other data compression and/or organizational technique. As may be contemplated, the methods of processing the usage data to improve the efficiency of the evaluation described herein are illustrative examples and other such methods of processing the usage data to improve the efficiency of the evaluation may be considered as within the scope of the present disclosure.

As a result of that evaluation, one or more feedback indicators may be issued 718 as described above. The one or more feedback indicators 720 may be transmitted to the user interface 722 to be provided for display in, for example, a window, a modal dialog box, or some other user interface element. For example, the warnings may be provided for display by encoding them in a webpage and/or a component of a webpage, encoded in an image file, provided as a file entry that is configured to be rendered by an application, or provided for display using some other method. The displayed warnings may then be further processed by the requester 702 including, for example, accepting and/or rejecting actions based on the warnings as described above.

Figure 8:
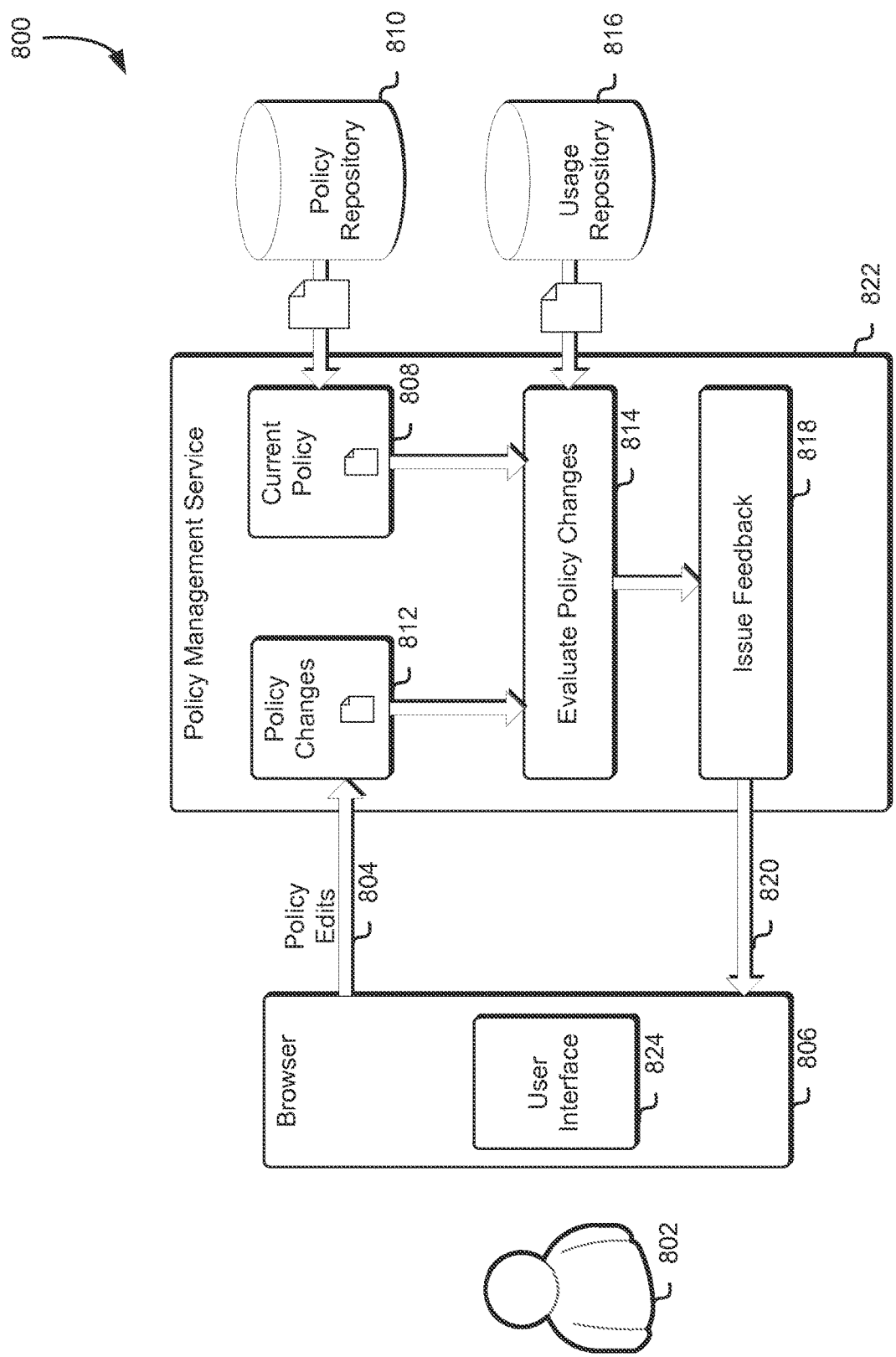
FIG. 8 illustrates an example diagram in which access control policy warnings and suggestions may be managed in accordance with an embodiment.

FIG. 8 is an illustrative example of a diagram 800 illustrating relationships between various aspects of the present disclosure in which access control policy warnings and suggestions may be managed in accordance with an embodiment. A requester 802 may generate one or more policy edits 804 as described above. The policy edits may be generated using a user interface 824, which may be configured as the user interface 722 described in connection with FIG. 7. In some embodiments, the user interface 824 may be a component of a browser 806. In some embodiments, the user interface 824 may be a separate component or application. The example illustrated in FIG. 8 shows the user interface 824 as a component of the browser 806.

The browser 806 may be configured to send the policy edits 804 to a policy management service. The policy management service 822 may be configured to retrieve the current policy 808 from a policy repository 810 and determine the policy changes 812 based on the policy edits 804 as described above in connection with FIG. 7. The policy management service 822 may then be configured to evaluate the policy changes 814 based on policy usage data retrieved from the usage repository 816, the policy changes 812, and/or the current policy 808. As a result of that evaluation, one or more feedback indicators may be issued 818 also as described above. The one or more feedback indicators 820 may be transmitted to the user interface 824 within the browser 806 to be displayed in, for example, a window, a modal dialog box, or some other user interface element. The displayed warnings may then be further processed by the requester 802 including, for example, accepting and/or rejecting actions based on the warnings as described above.

Figure 9:
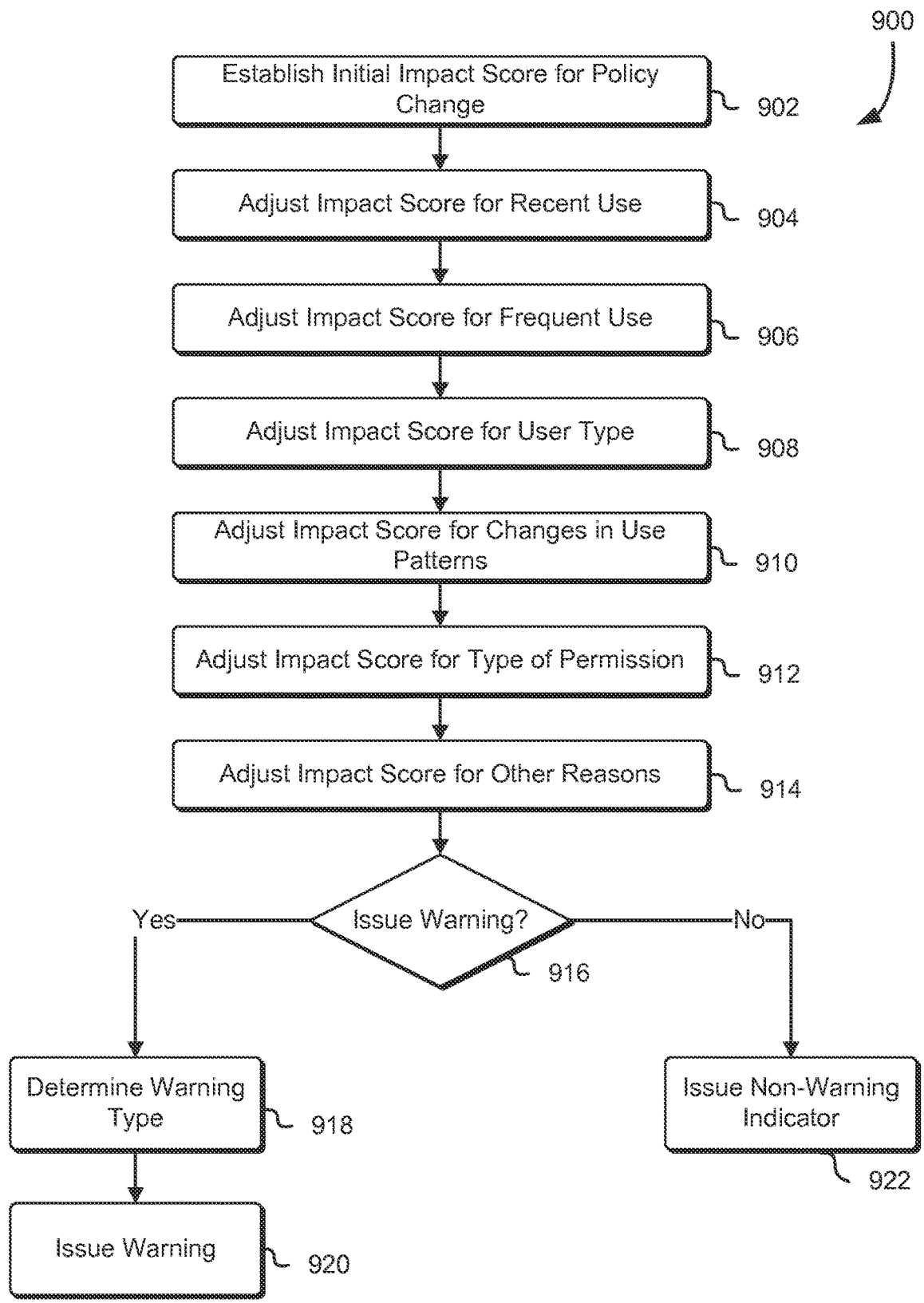
FIG. 9 illustrates an example of a process for determining the potential impact of access control policy changes in accordance with an embodiment.

FIG. 9 is an example of a process 900 for determining the impact of access control policy changes in accordance with an embodiment. A policy management service such as the policy management service 106 described in connection with FIG. 1, or a component thereof, such as a web server, may perform the process 900 illustrated in FIG. 9.

A policy management service may first receive a policy change (or policy edit) and may determine an initial impact score for that policy change 902. For example, the policy management service may determine an initial impact score based on the resource used, an identity of the user, one or more groups and/or roles associated with the user, an identity of the requester, the API calls used, or some other factors. The policy management service may then adjust that impact score based on patterns of recent use 904 of permissions that may be impacted by that policy change. In a first example, a policy change that removes a previously granted permission that was not used recently may have the impact score reduced. In a second example, a policy change that removes a previously granted permission that was recently used may have the impact score increased. In a third example, a policy change that adds a previously ungranted permission that was not recently required may have the impact score increased (i.e., because that permission may not be necessary). In a fourth example, a policy change that adds a previously ungranted permission that was recently required may have the impact score decreased (i.e., because that permission may be necessary). In the examples described, the impact score is decreased if the policy change conforms to recent usage requests and is increased if the policy change does not conform to recent usage requests.

The policy management service may next similarly adjust the impact score based on frequency of use 906 by, for example, decreasing the impact score if the policy change conforms to frequent usage requests and increasing the impact score if the policy change does not conform to frequent usage requests. The policy management service may then adjust the impact score for different user types 908 and/or for changes in use patterns 910. For example, a change in usage patterns for a human user may be relatively unimportant as that user of the human user type may have been temporarily accessing the resource. A policy change that does not conform to the changed usage patterns may have a lower impact because such a policy change may conform to the previous (correct) usage pattern. By contrast, a change in usage patterns for a user of the automatic user type (i.e., a program or process) may be comparatively important as that automatic user may have been altered for new behavior. A policy change that does not conform to the changed usage patterns for a particular user type may have a higher impact because such a policy may conform to the previous (incorrect) usage pattern. In some embodiments, the impact score may be adjusted to reflect the type of permission 912 and/or other system-defined reasons 914.

The policy management service may next perform operations to determine whether to issue a warning 916 such as, for example, by comparing the impact score to a threshold. In some embodiments, if it is determined to issue a warning, the policy management service may determine the type of warning to issue 918 and/or may also determine whether one or more suggestions should be issued with the warning. The warning and/or the suggestions may then be issued 920 to the requester. In some embodiments, the policy management may also issue a non-warning indicator 922 associated with the policy change such as, for example, an indicator that the policy change is acceptable.

Figure 10:
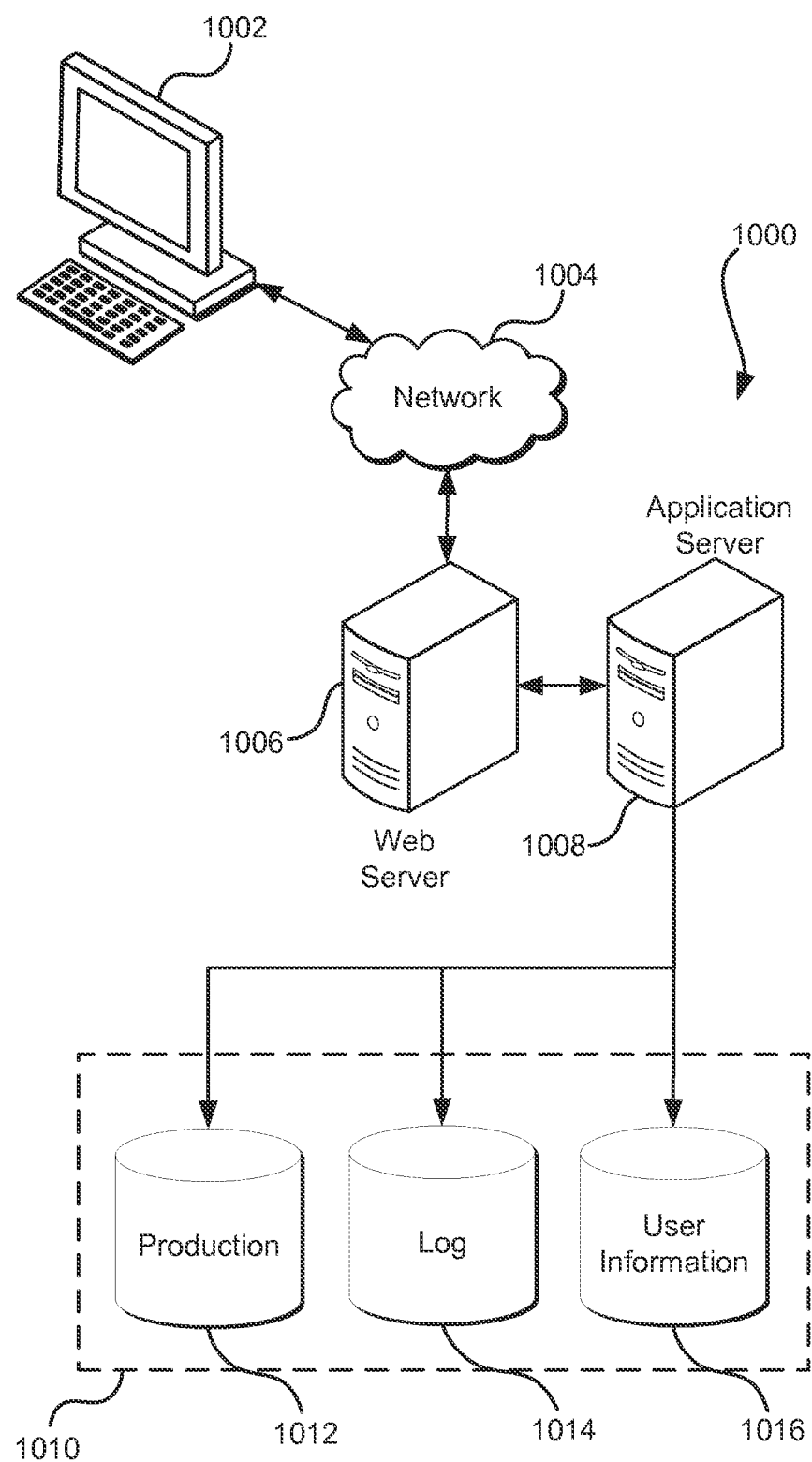
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a policy management service, a proposed access control policy change to an access control policy associated with a user of a computing resource service provider, the access control policy change specifying one or more effective permissions changes associated with one or more resources of the computing resource service provider;
    obtaining information generated as a result of a plurality of previously submitted application programming interface requests that implicate the access control policy;
    determining, based at least in part on the obtained information, impact information for the proposed access control policy change, the impact information indicating at least one of: the one or more permissions used in the past to be removed by the proposed access control policy change, or at least one of the one or more permissions unused in the past to be added by the proposed access control policy change;
    determining an impact score for the proposed access control policy change based, at least in part, on usage of the one or more resources specified in the access control policy change, the impact score weighted based on a frequency of use of the one or more resources wherein less frequent use corresponds to a lower impact score than more frequent use;
    producing a set of access control policy warnings, before the access control policy change becomes effective, based at least in part on the impact information of the proposed access control policy change, each access control policy warning of the set of access control policy warnings providing at least a subset of the impact information;
    determining a set of access control policy suggestions based at least in part on the set of access control policy warnings, each access control policy suggestion of the set of access control policy suggestions indicating a respective alternate set of changes to the set of effective permissions; and
    providing, based at least in part on the impact score at least meeting a threshold value, for display to the user, at least one of the set of access control policy warnings and at least one of the set of access control policy suggestions.

2. The computer-implemented method of claim 1, wherein the method further comprises adjusting the impact score based on a user type associated with the user.

3. The computer-implemented method of claim 1, wherein the set of changes to the set of effective permissions associated with one or more resources of the computing resource service provider comprises at least one of adding one or more missing unnecessary permissions to the set of effective permissions, the one or more missing unnecessary permissions determined based on the obtained information or removing one or more necessary permissions to the set of effective permissions, the one or more necessary permissions determined based on the obtained information.

4. The computer-implemented method of claim 1, wherein the obtained information comprises a set of obtained information records, each obtained information record in the set of obtained information records specifying usage of a subset of the set of effective permissions, wherein determining impact information for the proposed access control policy change comprises:
    parsing the obtained information to determine a subset of the set of obtained information records, the subset of the set of obtained information records selected based at least in part on the proposed access control policy change; and
    comparing each change of the set of changes to the set of effective permissions to each obtained information record in the subset of the set of obtained information records to determine the impact information.

5. A system, comprising:
    one or more processors; and
    memory that stores computer-executable instructions that, as a result of execution, cause the one or more processors to:
        obtain information indicating past usage of a set of effective permissions;
        receive a set of proposed changes implicating a proposed access control policy change to an access control policy associated with a user of a computing resource service provider, the access control policy change specifying one or more effective permissions changes associated with one or more resources of the computing resource service provider;
        determine, based at least in part on the obtained information, impact information for the proposed access control policy change, the impact information indicating at least one of: the one or more permissions used in the past to be removed by the proposed access control policy change, or at least one of the one or more permissions unused in the past to be added by the proposed access control policy change;

determine an impact score for the set of proposed changes based at least in part on the past usage of the one or more resources specified in the access control policy change, wherein the impact score is weighted according to frequency of the past usage;

determine a set of warnings, before the set of proposed changes are applied, based at least in part on the impact information of the proposed access control policy change, each warning of the set of warnings based at least in part on an impact of the set of proposed changes; and provide, based at least in part on the impact score at least meeting a threshold value, at least one of the set of warnings.

6. The system of claim 5, wherein the impact of the set of proposed changes indicates a change to a definition to a group of principals.

7. The system of claim 6, wherein the impact of the set of proposed changes is based at least in part on comparing a timestamp associated with the obtained information to a timestamp associated with one or more proposed changes of the set of proposed changes.

8. The system of claim 6, wherein the impact of the set of proposed changes is based at least in part on a frequency of used permissions based at least in part on the obtained information.

9. The system of claim 6, wherein the impact of the set of proposed changes is based at least in part on a user type associated with one or more proposed changes of the set of proposed changes.

10. The system of claim 5, wherein the computer-executable instructions include further instructions that, as a result of execution, further cause the one or more processors to provide a set of access control policy suggestions based at least in part on the set of warnings, each access control policy suggestion of the set of access control policy suggestions indicating a respective alternate set of changes to the set of permissions.

11. The system of claim 10, wherein the computer-executable instructions include further instructions that, as a result of execution, further cause the one or more processors to issue a request for a first set of suggestion approvals from the user, each suggestion approval of the set of suggestion approvals corresponding to a respective subset of the set of access control policy suggestions.

12. The system of claim 11, wherein the computer-executable instructions include further instructions that, as a result of execution, further cause the one or more processors to issue a notification when a second set of suggestion approvals received from the user in response to the request differs from the first set of suggestion approvals.

13. A non-transitory computer-readable storage medium comprising executable instructions that, when executed by one or more processors of a computer system, cause the computer system to at least:

obtain information indicating past usage of a set of permissions;

receive a set of proposed changes implicating a proposed access control policy change to an access control policy associated with a user of a computing resource service provider, the access control policy change specifying one or more effective permissions changes associated with one or more resources of the computing resource service provider;

determine, based at least in part on the obtained information, impact information for the proposed access control policy change, the impact information indicating at least one of:

the one or more permissions used in the past to be removed by the proposed access control policy change, or at least one of the one or more permissions unused in the past to be added by the proposed access control policy change;

determine an impact score based at least in part on weighing the past usage of the set of permissions indicated in the access control policy change, wherein less frequent past usage corresponds to a lower impact score than more frequent past usage;

determine a set of suggestions based at least in part on the determined impact information, each suggestion of the set of suggestions indicating a respective alternate set of changes to the set of permissions; and provide, for display to a user of the computer system and based at least in part on the impact score at least meeting a threshold value, at least one of the set of suggestions.

14. The non-transitory computer-readable storage medium of claim 13, wherein the instructions further comprise instructions that, when executed by the one or more processors, cause the computer system to provide a set of warnings, each warning of the set of warnings corresponding to one or more changes to the set of changes.

15. The non-transitory computer-readable storage medium of claim 14, wherein the set of suggestions includes one or more suggestions that indicate a change to a definition to a group of principals.

16. The non-transitory computer-readable storage medium of claim 14, wherein the set of suggestions includes one or more suggestions that alter one or more permissions specified in a group policy, the group policy applicable to any principal in a group of principals.

17. The non-transitory computer-readable storage medium of claim 13, wherein the obtained information is generated as a result of a plurality of previously submitted application programming interface requests that implicate the set of permissions.

18. The non-transitory computer-readable storage medium of claim 13, wherein the obtained information is obtained from a request log, the request log configured to record a plurality of request log entries, each request log entry is generated as a result of a previously submitted application programming interface request.

19. The non-transitory computer-readable storage medium of claim 13, wherein the obtained information is obtained from a set of records, each record of the set of records generated by aggregating a plurality of previously submitted application programming interface requests that implicate the set of changes.

20. The non-transitory computer-readable storage medium of claim 13, wherein the instructions further comprise instructions that, when executed by the one or more processors, cause the computer system to adjust the impact score based on a user type associated with the user.

* * * * *